No. 879,689. PATENTED FEB. 18, 1908.
A. STANDAU.
PROPELLER.
APPLICATION FILED MAY 23, 1907.
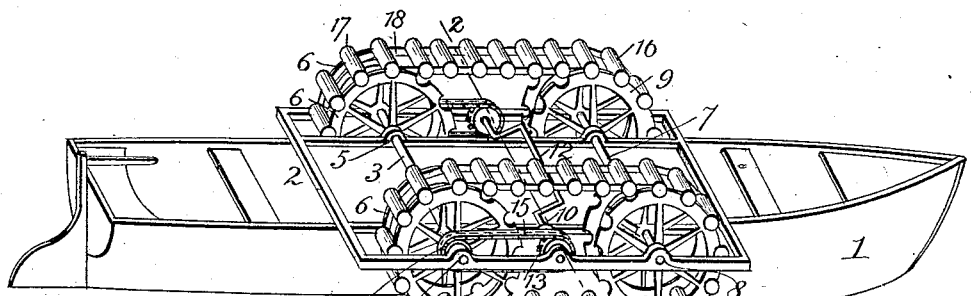
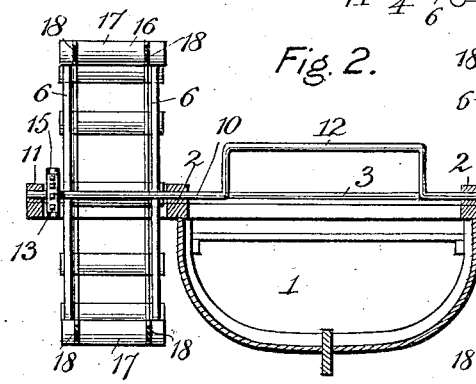
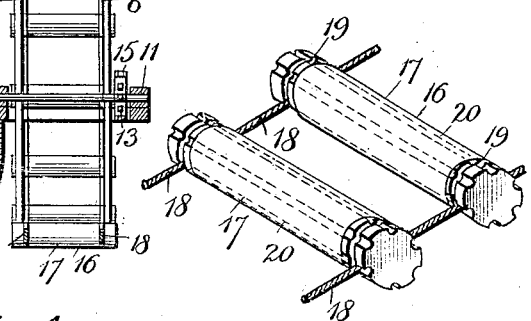
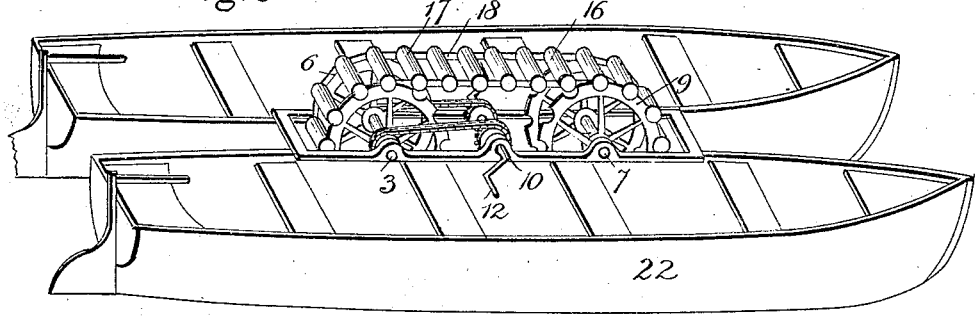
Inventor
Albert Standau.
Witnesses

UNITED STATES PATENT OFFICE.

ALBERT STANDAU, OF TERRE HAUTE, INDIANA.

PROPELLER.

No. 879,689.　　　Specification of Letters Patent.　　　Patented Feb. 18, 1908.

Application filed May 23, 1907.　Serial No. 375,320.

*To all whom it may concern:*

Be it known that I, ALBERT STANDAU, a citizen of the United States, residing at Terre Haute, in the county of Vigo and State of Indiana, have invented certain new and useful Improvements in Propellers; and I do declare the following to be a full, clear, and exact description of the invention, such as will enable others skilled in the art to which it appertains to make and use the same.

My invention has relation to new and useful improvements in propellers, and essentially comprises a series of cylindrical, oval or other shaped paddles linked together to form an endless system of paddles adapted to be applied to a boat, preferably of the row boat type.

My invention consists in the novel features of construction, combination and arrangement of parts illustrated in the drawings and particularly pointed out in the specification and claims hereunto appended; it being understood that various changes in the form, proportion and minor details of construction may be resorted to without departing from the spirit or sacrificing any of the principles of the invention.

In the accompanying drawings,—Figure 1 is a perspective view of my propeller applied to an ordinary row boat; Fig. 2 is a cross sectional view on the line 2—2 of Fig. 1; Fig. 3 is a detail perspective view of a section of the endless chain of paddles; Fig. 4 is a detail perspective view of the housing adapted to fit over the paddles; and Fig. 5 is a perspective view of the propeller applied between two ordinary row boats, or what I term a "twin boat".

Referring now more particularly to the drawings, the numeral 1 represents a vessel of the row boat type.

2 represents a supporting frame, which is arranged longitudinally of and is secured to the body portion of said boat in any suitable substantial manner.

A transverse drive axle 3 is journaled at its outer ends in suitable bearings 4 secured to said frame, and at intermediate points in suitable bearings 5 fixed to the boat body in any suitable manner.

The numeral 6 represents two corresponding drive sprocket wheels, which are fixed to said drive axle 3, one near each end thereof. A transverse axle 7 is journaled at its outer ends in suitable bearings 8 of said supporting frame 2, and at intermediate points in suitable bearings fixed to the boat body. Said axle 7 is located a suitable distance forward of said drive axle 3, and has fixed thereto two corresponding sprocket wheels 9, which correspond with and are preferably in longitudinal alinement with said drive sprocket wheels 6. A transverse axle 10 is journaled at its outer ends in suitable bearings 11 arranged on said frame 2 between said first and last mentioned sprocket wheels 6 and 9, respectively, and is provided at a point between its ends with a crank 12. Fixed to said transverse axle at a suitable point between its ends is a drive pinion 13, and working over said drive pinion and a pinion 14 of suitable size, fixed to said transverse drive axle 3 is an endless drive chain 15.

The numeral 16 represents an endless paddle chain, which comprises a series or plurality of elongated paddles of preferably cylindrical form, linked or joined together equidistances apart by suitable flexible members in the form of wires or cables 18 wrapped around and in circumferential grooves 19 in and near the ends of said paddles. Each of said paddles is preferably incased or inclosed between its circumferential grooves in a suitable casing 20 of canvas or other suitable material to increase the resistance offered to their passage through the water, and to deaden the noise generated thereby. A suitable housing 21 is preferably fitted over said endless chain of paddles 16 and is removably secured to said supporting frame 2 in any suitable manner, and serves to prevent water from splashing on the occupants of the boat. If found desirable, said propeller may be arranged to work between two boats 22, or what I term a "twin boat." (See Fig. 5.) In the application of my invention, said drive wheels 6 are put in rotation by turning said crank 12 when the ends of said paddles 17 engage between the teeth of said drive sprocket wheels and working over the same and over said sprocket wheels 9.

Having thus described my invention, what I claim as new and desire to secure by Letters-Patent is:—

1. In a propeller, the combination of a frame, two oppositely disposed drive sprocket wheels journaled near one end of said frame, two oppositely disposed sprocket wheels journaled near the opposite end of said frame, an endless paddle chain comprising a series of elongated cylindrical paddles having each a circumferential groove near each end, flexible members engaging the grooves for connecting said paddles together, the paddles being arranged equidistantly apart and adapted to work over said sprocket wheels, and a flexible casing incasing each of said paddles between its grooves.

2. In a propeller, the combination of a frame, two oppositely disposed drive sprocket wheels journaled near one end of said frame, two oppositely disposed sprocket wheels journaled near the opposite end of said frame, an endless paddle chain comprising a series of elongated cylindrical paddles having each a circumferential groove near each end, flexible members engaging the grooves for connecting said paddles together, the paddles being arranged equidistantly apart and adapted to work over said sprocket wheels, a flexible casing incasing each of said paddles between its grooves, and a housing mounted on said frame and fitting over said chain of paddles.

3. In a propeller, an endless chain comprising a series of elongated paddles, each having a groove near each end thereof, flexible means engaging said grooves for connecting said paddles together, flexible casings inclosing the greater portions of said paddles, and means for rotating said paddles.

4. In a propeller, the combination of a supporting frame, a paddle chain comprising a series of cylindrical paddles flexible members connecting said paddles together, the paddles being arranged equidistantly apart and working in said frame, means carried by said frame for rotating said paddles, flexible casings incasing the greater portions of said paddles, and a housing mounted on said frame and fitting over said paddle chain.

5. In a propeller, the combination of a supporting frame, a paddle chain comprising a series of cylindrical paddles flexible members connecting the paddles together, said paddles being arranged equidistantly apart and working in said frame, means carried by said frame for rotating said paddles, and flexible casings incasing the greater portions of said paddles.

6. In a propeller, a paddle chain comprising a series of elongated cylindrical paddles flexible members connecting the paddles together, and flexible casings incasing the greater portions of said paddles.

In testimony whereof I have hereunto set my hand in presence of two subscribing witnesses.

ALBERT STANDAU.

Witnesses:
HARRY FISBECK,
WM. A. THORNTON.